United States Patent Office 3,492,352
Patented Jan. 27, 1970

3,492,352
ARYL-SUBSTITUTED ALIPHATIC TERTIARY AMINES
Eugene J. Miller, Jr., Wheaton, and Harlan E. Tiefenthal, Western Springs, Ill., assignors, by mesne assignments, to Armour Industrial Chemical Company, a corporation of Delaware
No Drawing. Continuation-in-part of application Ser. No. 500,203, Oct. 21, 1965. This application Oct. 31, 1966, Ser. No. 590,474
Int. Cl. C07c 87/28; C11d 1/38; B01j 13/00
U.S. Cl. 260—570.8                9 Claims

ABSTRACT OF THE DISCLOSURE

Aryl-substituted aliphatic tertiary amine compounds having substituted on a nitrogen atom at least one long chain alkyl group having an aryl group attached to an internal carbon atom thereof, useful in the preparation of quaternary ammonium compounds and as surface active agents.

CROSS REFERENCE TO RELATED APPLICATIONS

This application is a continuation-in-part of copending application Ser. No. 500,203, filed Oct. 21, 1965 and now U.S. Patent No. 3,444,200, and of copending application Ser. No. 502,563, filed Oct. 22, 1965 and now abandoned.

This invention relates to a novel class of aryl-substituted aliphatic tertiary amines and process for their production, and more particularly this invention relates to tertiary amines containing at least one long chain aliphatic group to which an aryl group is attached as a side chain, thereby providing an aralkyl group. The compounds may contain one or two tertiary amine groups, being tertiary monoamines or tertiary diamines.

The compounds of this invention have utility in their salt forms as surface agents. They can also be used to prepare mono- and di-quaternary ammonium compounds as described in the cited applications Ser. Nos. 500,203 and 502,563. Such mono- and di-quaternaries are useful as emulsifiers, such as cationic emulsifiers for asphalt or other bituminous emulsions.

The amine compounds of the present invention can be represented by the following structural formula:

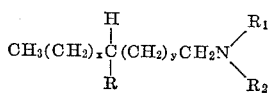

wherein $x$ and $y$ are integers from 0 to 19 and the total of $x$ and $y$ is an integer from 8 to 19, and R is an aryl group selected from phenyl, naphthyl, and phenyl substituted with from 1 to 2 groups selected from methyl, hydroxy, methoxy, and phenoxy. In a preferred subclass of compounds $x$ and $y$ are integers from 0 to 15, and the total of $x$ and $y$ is 15.

It will be noted from the foregoing formula that the tertiary amine compounds contain at least one long chain aryl-substituted aliphatic group, or, more specifically, an aralkyl group. In one embodiment, the alkyl portion of the aralkyl group contains a total of 18 carbons. In other embodiments, the alkyl portion of the aralkyl groups can contain 11, 16 or 22 carbons. More generally, the total of $x$ and $y$ (which is three less than the total of carbons in the alkyl portion of the aralkyl) may range from 8 to 19.

$R_1$ and $R_2$ are selected from (1) alkyls of 1 to 3 carbons; (2) —$(CH_2CH_2O)_pH$ for $R_1$ and —$(CH_2CH_2O)_rH$ for $R_2$;

(3) 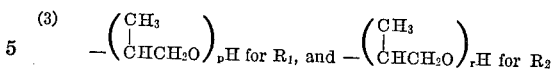

(4) 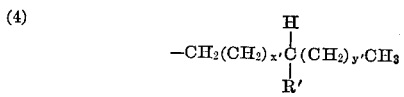

for $R_2$ where $R_1$ is selected from (A) alkyls of 1 to 3 carbons, (B) —$(CH_2CH_2O)_pH$, and (C)

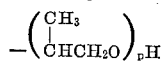

and (5) —$(CH_2)_zNR_3R_4$ for $R_2$ where $R_1$, $R_3$, and $R_4$ are selected from (A) alkyls of 1 to 3 carbons, (B) —$(CH_2CH_2O)_mH$ for $R_1$, —$(CH_2CH_2O)_wH$ for $R_3$, and —$(CH_2CH_2O)_sH$ for $R_4$, and (C)— 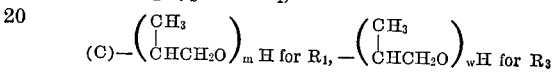

and

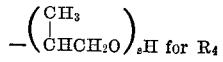

The letters $p$ and $r$ are integers from 1 to 40 with the total of $p$ plus $r$ not exceeding 60. In a preferred subclass, $p$ and $r$ are integers from 1 to 20 with the total of $p$ plus $r$ not exceeding 30.

The letters $m$, $w$, and $s$ are integers from 1 to 40 with the total of $m$ plus $w$ plus $s$ not exceeding 80. In a preferred subclass, $m$, $w$, and $s$ are integers from 1 to 20 with the total of $m$ plus $w$ plus $s$ not exceeding 50.

The letters $x'$ and $y'$ are each an integer as defined for $x$ and $y$ above.

The letter $R'$ is selected from R as defined above and H.

In another preferred subclass, $R_1$ and $R_2$ are methyl. $R_1$ and $R_2$ may also be ethyl or propyl.

The letter $z$ is an integer from 2 to 6. In a preferred subclass, $z$ is equal to 3.

In the formula, R represents the aryl substituent. The carbon to which the aryl group is attached varies with the respective values of $x$ and $y$. With unsaturated alkylene chains, such as oleyl, under most reaction conditions the double bond migrates up and down the chain (isomerization by hydrogen ion transfer) resulting in a mixture of isomeric products. In arylating oleyl, there is a tendency for the $C_8$–$C_{14}$ and the $C_{17}$ aryl isomers to predominate, but smaller mole percentages of other isomers, such as the $C_6$, $C_7$, $C_{15}$ and $C_{16}$ isomers are also produced. The mole percent of the $C_2$–$C_5$ isomers is usually quite small or even negligible. The relative proportions of the various isomers may vary depending on the arylation process. See J. Org. Chem. 30, 885–888 (1965). However, the total of $x$ and $y$ will remain constant for the particular substituted chain, viz. 15 for stearyl, 8 for undecyl, 19 for behenyl, etc. By arylation, oleic acid is converted to aryl-substituted stearic acid. Similarly, palmitoleic, erucic, and 10-undecenoic acids can be converted to the corresponding aryl-substituted carboxylic acids. Ordinary commercial grade oleic acid contains several percent of palmitoleic acid, and therefore a mixture of aryl-substituted stearic and palmitic acids is obtained by arylation.

Among the preferred aryl substituents on the aliphatic group are phenyl, hydroxyphenyl, tolyl, ansyl, and naphthyl. The phenyl nucleus may be substituted with 1 or 2 groups such as methyl, hydroxy, methoxy, and phenoxy.

Examples of aryl substituents coming within this subclass are cresyl, resorcyl, and xylyl.

The tertiary amine compounds may be in the form of mono- or di-amine salts of acids, such as hydrochloric, sulfuric, nitric, perchloric, formic, acetic, etc. The salt forms may be more water soluble or dispersible, and therefore better adapted for aqueous systems.

The tertiary amine compounds of our invention may be formed from arylaliphatic primary amines, diarylaliphatic secondary amines, and arylaliphatic diamines.

As previously indicated, the aryl fatty acids, such as arylstearic acid or arylpalmitic acid, may be prepared by the arylation of the corresponding unsaturated fatty acid (e.g., oleic acid or palmitoleic acid). A catalyst is ordinarily required for such arylation, as is well known in the art. For example, aluminum chloride may be employed as the catalyst. With this process, the fatty acid is preferably first converted to the cyano or nitrile derivative, which is then reacted with the arylating agent in the presence of aluminum chloride. The aryl cyanoaliphatic compound can then be reduced to the corresponding primary amine by hydrogenation in the presence of a catalyst such as Raney nickel.

For direct arylation of unsaturated acids other catalysts are preferred, such as acid activated clays, or hydofluoric acid. A process employing an activated clay is described in U.S. Patent 3,074,983, while use of hydrofluoric acid is described in U.S. Patent 2,275,312. An improved process utilizing hydrofluoric acid is described and claimed in the copending application, Ser. No. 451,021, filed Apr. 26, 1965, and now abandoned, entitled "Process for Arylating Unsaturated Fatty Compounds." The compounds arylated by this process are suitable for use in the preparation of the tertiary amines of this invention.

Reference to a specific example illustrating the synthesis of an arylaliphatic primary amine follows:

EXAMPLE I

Phenylstearic acid was prepared from commercial grade oleic acid which contained a few percent of palmitoleic acid by a Friedel-Crafts reaction using hydrofluoric acid as the catalyst and benzene as the arylating agent. Thereafter, phenylstearonitrile was prepared on a continuous nitrile unit over bauxite catalyst at 280–300° C. from 1127 gms of phenylstearic acid. A crude yield of 833.5 gms. of phenylstearonitrile was obtained comprising a mixture of isomers with respect to location of the phenyl group, predominately the $C_8$ to $C_{14}$, and the $C_{17}$ isomers with lesser proportions of other isomers.

Phenylstearonitrile (591 gms.) was reduced in a 1-liter, Parr autoclave over 2% (by wt.) alcohol washed Raney nickle catalyst in the presence of ammonia (150 p.s.i. at 30–40° C.) and hydrogen (800 p.s.i. total pressure at 125° C.) for 4–5 hours. The product was obtained as a light amber oil, 582.3 gms. (97% crude yield). Phenyloctadecylamine was obtained in 67% yield upon distillation at 183–190° C. at 0.3 mm.

Di-arylaliphatic secondary amines may be obtained from arylaliphatic nitriles by reduction under hydrogen pressure at about 200° C. In the presence of a hydrogenation catalyst such as copper chromite or Raney nickel. These compounds and the process for their production are described in our copending application, Ser. No. 585,751, filed Oct. 11, 1966, entitled "Aryl-Substituted Aliphatic Secondary Amines." All of the di-arylaliphatic secondary amines described in this patent application are among the suitable reactants to form the tertiary amines of our invention. Reference to a specific example illustrating the synthesis of a di-arylaliphatic secondary amine follows:

EXAMPLE II

A one-liter Magne-dash autoclave was charged with 552.3 gms. (1.62 moles) phenyloctadecylnitrite and 19.6 gms. (3% by wt.) copper chromite catalyst. The reactor was flushed with hydrogen and the temperature raised to 195° C. Hydrogen pressure was maintained at 200 p.s.i.g. with continuous bleeding and the temperature maintained at about 195–200° C. After 28 hours of reaction, the mixture was cooled and filtered to yield 525.1 gms. (96.2% mass yield) of viscous amber oil, analyzed as follows:

Neutralization equivalent (calcd. 674) _____ 710
Primary amine _____ Nil
Di-(phenyloctadecyl) amine _____percent__ 93.7
Tertiary amine _____do____ 2.7

Arylaliphatic diamines suitable for reactants in our invention are those formed from primary arylaliphatic amines by cyanoalkylation followed by reduction as described in copending application, Ser. No. 500,359, filed Oct. 21, 1965 and now abandoned entitled "Aryl-Substituted Aliphatic Diamine Compounds." All of the arylaliphatic diamine compounds described in this patent application are among the suitable starting materials to produce the tertiary amines of our invention. A specific example illustrating the preparation of such a diamine compound follows:

EXAMPLE III

Acrylonitrile (61.0 gms., 1.15 moles) was added slowly over 2 hours, with stirring, to phenyloctadecylamine prepared as described in Example I (363.8 gms., 1.05 moles) and 17.0 gms. water at 60–70° C. The resulting mixture was then stirred at 70–80° C. for 4 additional hours. The water was separated and the product, N-(beta-cyanoethyl) phenyloctadecylamine, was dried under reduced pressure at 60–70° C. Analysis of the product showed:

Neutralization equivalent (calcd. 398.6) _____ 401
Primary amine _____ Nil
Secondary amine _____percent__ 99.5

The N-(beta-cyanoethyl) phenyloctadecylamine was reduced in the presence of 1% alcohol washed Raney nickel, ammonia (125 p.s.i. at 40° C.) and hydrogen (800 p.s.i. total pressure) at 135° C. in 6–7 hours, thereby obtaining N-(gamma-aminopropyl) phenyloctadecylamine. The product was a mixture of isomers containing primarily the $C_8$ to $C_{14}$ and the $C_{17}$ isomers, analyzing as follows:

Neutralization equivalent (calcd. 201.3) _____ 201
Primary amine _____percent__ 53.4
Secondary amine _____do____ 45.5

According to our invention, aryl-substituted aliphatic primary and secondary amines can be converted to corresponding mono-tertiary amines, and aryl-substituted aliphatic diamines can be converted to corresponding di-tertiary amines by alkylation or alkoxylation.

The alkylated arylalkyl tertiary amines can be prepared by reductive alkylation of the above-mentioned arylaliphatic amines with aldehydes in the presence of a hydrogen source and heat from about 50–150° C. When hydrogen is supplied directly, a hydrogenation catalyst such as Raney nickel is preferably employed. An example of a chemical hydrogen source is formic acid.

The alkoxylated arylalkyl tertiary amines can be prepared by reacting the above-mentioned arylaliphatic amines with an alkylene oxide at about 50–200° C. and a pressure of about 0–100 p.s.i.g. Preferably the reaction temperature is from about 100–150° C. and pressure preferably less than 50 p.s.i.g. For example, the amine can be reacted with ethylene oxide or propylene oxide and it is understood that the ethylene or propylene oxide for reaction with the amine will distribute between the $R_1$ and $R_2$ groups, and in case of the diamine will distribute between the $R_1$, $R_3$ and $R_4$ groups in adduct formation.

This invention is further illustrated by the following specific examples. From what has been said above, it will be understood that the products of the examples are in the form of isomeric mixtures.

EXAMPLE IV

A 300-ml. stainless steel, stirred autoclave was charged with phenylstearylamine (97.3 gms., 0.284 mole), glacial acetic acid (1 ml.) and Raney nickel catalyst (2 gms. alcohol washed). The temperature was raised to 115° C. and hydrogen added under pressure to 175 p.s.i. while maintaining a continuous vent. Formacel (45–55% solution of formaldehyde in methanol) was then pumped in slowly. At 8 ml., 17 ml., 24 ml., and 30 ml. of Formacel added, the pumping was stopped and the vessel vented to 0 p.s.i. After 30 ml. of Formacel had been added, a sample was analyzed and 0.5 ml. additional Formacel was added to complete the reaction. The reaction mixture was filtered to give crude N,N-dimethyl phenylstearylamine in 90.5% yield. Distillation afforded the tertiary amine in 68.7% yield having the following analysis:

Neutralization equivalent (calcd. 373) _____ 372
Primary amine _____percent__ 1.38
Secondary amine _____do____ 1.44
Tertiary amine _____do____ 97.2

EXAMPLE V

A one liter Parr autoclave was charged with 700 g. (1.95 moles) of tolyloctadecylamine, 7 g. of acetic acid and 14 g. of wet Raney nickel. The mixture was heated to 120° C., purged with nitrogen to remove any water vapor and then hydrogen introduced at 150 p.s.i.g. The reaction mixture was maintained at 120° C. at 150 p.s.i.g. with a continuous bleed while 213 g. of Formacel was pumped in at 0.8 cc. per minute with occasional purging of the system to remove water and methanol. The mixture was stirred for an additional hour after the Formacel was added, then cooled and filtered. The tertiary amine product, N,N-dimethyl tolyloctadecylamine, was obtained as a yellow oil 697 g. (99.7% mass yield).

Analysis:
  Neut. equivalent (calcd. 387) _____ 450
  Primary amine _____ Nil
  Secondary amine _____percent__ 0.47
  Tertiary amine _____do____ 85.5

Formacel refers to alcoholic solutions of formaldehyde consisting of a mixture of hemiacetals of monomeric and polymeric formaldehyde. In the above case, the Formacel consisted of about 45–55% HCHO in methanol containing about 10% water.

EXAMPLE VI

A two liter four neck Morton flask equipped with a thermometer, reflux condenser, addition funnel and mechanical stirrer, was charged with 181 g. (0.737 mole) of phenylundecylamine and 100 ml. of 50% aqueous isopropanol. Formic acid (225 g., 4.42 moles) was added to the stirred mixture at 25–30° C. over a five hour period. The temperature of the reaction mixture was raised to 60–75° C. and 239 g. (2.95 moles) of formaldehyde were added over a one and one-half hour period. The resulting mixture was then refluxed overnight (88° C.). After cooling, 50% sodium hydroxide was added until the mixture reached pH 11. Pentane was added to extract the amine and the pentane layer washed with three 250 ml. portions of water. The pentane solution was dried over anhydrous sodium sulfate, filtered and stripped to yield 199.1 g. (98.3% mass yield) of yellow oil, containing the tertiary amine, N,N-dimethylphenylundecylamine.

Analysis:
  Neut. equivalent (calcd. 276) _____ 329
  Primary amine _____percent__ 0.7
  Secondary amine _____do____ 2.6
  Tertiary amine _____do____ 83.9

EXAMPLE VII

A two liter four neck Morton flask, equipped with a thermometer, reflux condenser, addition funnel and mechanical stirrer, was charged with 201.5 g. (0.5 mole) of phenyldocosylamine and 100 ml. of 50% aqueous isopropanol. Formic acid (154 g., 3.0 moles) was added to the stirred mixture at 20–25° C. over a five hour period. The temperature of the mixture was then raised to 60–68° C. and 162 g. (2.0 moles) of formaldehyde were added over two hours. The resulting mixture was then refluxed (88° C.) overnight. After cooling, 50% aqueous sodium hydroxide was added until the mixture reached pH 11. Pentane was added to extract the amine and the pentane layer washed with three 250 ml. portions of water. The pentane solution was dried over anhydrous sodium sulfate, filtered and stripped to yield 116.8 g. (54.6% mass yield) of yellow oil, containing the tertiary amine, N,N-dimethylphenyldocosylamine.

Analysis:
  Neut. equivalent (calcd. 429) _____ 500
  Primary amine _____percent__ 0.4
  Secondary amine _____do____ 0.41
  Tertiary amine _____do____ 85.8

EXAMPLE VIII

A 300 ml. stainless steel stirred autoclave was charged with 35.1 g. (0.087 mole) of phenylundecylamine. The reactor was sealed and the amine heated to 100° C. Propylene oxide (12.9 g., 0.222 mole) was added at 100–115° C./0–50 p.s.i.g. over a one hour period. The reaction mixture was stirred for an additional hour and then cooled. The product (48.0 g.) was obtained as an amber, viscous oil, analyzing as follows:

Analysis:
  Neut. equivalent (calcd. 551) _____ 554
  Tertiary amine _____percent__ 99.4

EXAMPLE IX

A 500 ml. glass reactor was charged with 70.0 g. (0.196 mole) of tolyloctadecylamine and then flushed thoroughly with nitrogen at 8 p.s.i.g. The amine was heated to 90° C. and 17.5 g. (0.392 mole) of ethylene oxide was gradually added developing about 30 p.s.i.g. pressure. After an induction period, the reaction proceeded slowly. The temperature was maintained at 100–110° C. for five hours. N,N-di-(beta-hydroxyethyl)tolyloctadecylamine was obtained as an amber oil in 93.5% mass yield, analyzing as follows:

Analysis:
  Neut. equivalent (calcd. 453) _____ 464
  Tertiary amine _____percent__ 95.5
  Glycol _____do____ 1.8

EXAMPLE X

A 300 ml. stainless steel autoclave was charged with 52.4 g. (0.13 mole) of N,N-di-(beta-hydroxyethyl) tolyloctadecylamine and 0.5 g. (1% by wt.) of sodium hydroxide. The reactor was sealed and purged with nitrogen at 15 p.s.i.g. The amine was heated to 145° C. and 30.4 g. (0.69 mole) of ethylene oxide was added slowly, developing about 50 p.s.i.g. of pressure. After four hours at 145–150° C., 13.2 g. of tertiary amine product was removed.

Analysis:
  Neut. equivalent (calcd. 585) _____ 595
  Glycol _____percent__ 5.2

EXAMPLE XI

An additional 47.5 g. (1.08 moles) of ethylene oxide was added to the remaining amine (0.108 mole) of Example X in the reactor at 145–150° C. and the reaction continued for six additional hours. The tertiary amine product was obtained as a dark oil.

Analysis:
Neut. equivalent (calcd. 1025) _____ 1030
Glycol _____percent__ 12.5

EXAMPLE XII

A 500 ml. glass reactor was charged with 107.3 g. (0.44 mole) of phenylundecylamine and sealed. The amine was heated to 138° C. and 38.9 g. (0.88 mole) of ethylene oxide were added slowly, developing about 30 p.s.i.g. pressure. The reaction began slowly, after an induction period, and was complete in about five hours at 140–150° C. The tertiary amine product, N,N-di-(beta-hydroxyethyl)phenylundecylamine, was obtained as a yellow oil in 95.2% yield.

Analysis:
Neut. equivalent (calcd. 334) _____ 341
Tertiary amine _____percent__ 97.3
Glycol _____ Nil

EXAMPLE XIII

A 500 ml. glass reactor was charged with 63.7 g. (0.158 mole) of phenyldocosylamine and then purged with nitrogen. The reactor was sealed and the amine was heated to 140° C. Ethylene oxide (13.9 g., 0.316 mole) was added slowly, developing about 30 p.s.i.g. pressure. The reaction began slowly, after an induction period, and was complete in about five hours at 140–145° C. The teritary amine product, N,N-di-(beta-hydroxyethyl)phenyldocosylamine, was obtained as an amber oil in almost quantitative yield.

Analysis:
Neut. equivalent (calcd. 488) _____ 510
Tertiary amine _____percent__ 92.8
Glycol _____do____ 1.5

EXAMPLE XIV

A 300 ml. stainless steel stirred autoclave was charged with 55.8 g. (0.18 mole) of N-(gamma-aminopropyl)-phenylundecylamine. The reactor was sealed and the amine heated to 100° C. Propylene oxide (52.2 g., 63 ml. 0.90 mole) was added at 100–115° C./0–50 p.s.i.g. over a two hour period. The reaction mixture was allowed to stir for an additional three hours and then cooled. The di-tertiary amine product, a "propoxylated diamine" containing five moles of propylene oxide, was obtained in 97.3% mass yield (105.0 g.).

Analysis:
Neut. equivalent (calcd. 297) _____ 295
Tertitary amine _____percent__ 100

EXAMPLE XV

A 250 ml. glass reactor was charged with 50.0 g. (0.16 mole) of N-(gamma-aminopropyl)phenylundecylamine. The reactor was sealed, flushed with nitrogen gas at 15 p.s.i.g. and heated to 140° C. Ethylene oxide (28.2 g., 0.64 mole) was added at 140–150° C./10–45 p.s.i.g. over a six hour period, whereupon the reaction mixture was cooled. The di-tertiary amine product was obtained as a viscous, dark amber oil.

Analysis:
Neut. equivalent (calcd. 240) _____ 240
Tertiary amine _____percent__ 99.9

EXAMPLE XVI

A 500 ml. glass reactor was charged with 73.5 g. (0.155 mole) of N-(gamma-aminopropyl)phenyldocosylamine. The reactor was sealed and the amine heated to 140° C. Ethylene oxide (50.5 g., 1.15 moles) was added slowly over a five hour period. The di-tertiary amine product was obtained as an amber oil.

Analysis:
Neut. equivalent (calcd. 391) _____ 400
Tertiary amine _____percent__ 96.6

EXAMPLE XVII

A 500 ml. glass reactor was charged with 70.9 g. (0.15 mole, 0.3 equivalent) of N-(gamma-aminopropyl) xylyloctadecylamine and the amine flushed with nitrogen at 5 p.s.i.g. The reactor was sealed and the amine heated to 140° C. under a nitrogen atmosphere (5 p.s.i.g.). Ethylene oxide was added slowly over a 4.5 hour period until about 27 ml. (24.0 g., 0.546 mole) had been taken up. The di-tertiary amine, N,N',N'-tri(beta-hydroxyethyl)-N-(xylyloctadecyl)trimethylene diamine, was obtained as an amber oil.

Analysis:
Neut. equivalent (calcd. 302) _____ 316
Tertiary amine _____percent__ 95.6

EXAMPLE XVIII

A 300 ml. stainless steel stirred auoclave was charged with 67 gms. (0.101 mole) of di-(phenyloctadecyl)amine. The reactor was sealed and the amine heated to 100° C. Ethylene oxide 4.4 gms. (0.10 mole) was added at about 100° C./0–50 p.s.i.g. over a one hour period. The reaction mixture was stirred for an additional two hours and then cooled. The product (68.5 gms.) was obtained as an amber, viscous oil, analyzing as follows:

Neutralization equivalent (calcd. 704) _____ 701
Tertiary amine _____percent___ 100
Glycol _____do____ 0.8

EXAMPLE XIX

A one liter three neck flask equipped with a thermometer, reflux condenser, addition funnel and mechanical stirrer, was charged with 90 gms. (0.136 mole) of di-(phenyloctadecyl) amine and 110 ml. of 50% aqueous isopropanol. Formic acid, 14.3 gms. (0.272 mole) was added to the stirred mixture at 29–30° C. over a one hour period. The temperature of the reaction mixture was raised to 65–70° C. and 14.75 gms. (0.182 mole) of formaldehyde (37%) were added over about one hour period. The resulting mixture was then refluxed for two hours. After cooling, 50% sodium hydroxide was added until the mixture reached pH 11. Pentane was added to extract the amine and the pentane layer washed with water until the washings were neutral. The pentane solution was dried over anhydrous sodium sulfate, filtered and stripped to yield 103.2 gms. (98% mass yield) of crude N-methyl-N,N-di-(phenyloctadecyl) amine.

Neutralization equivalent (calcd. 675) _____ 652
Primary amine _____percent___ 1.0
Secondary amine _____do____ 2.6
Tertiary amine _____do____ 98.6

We claim:
1. Aryl-substituted aliphatic tertiary amines represented by the formula

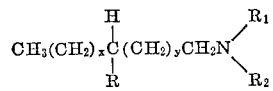

wherein $x$ and $y$ are integers from 0 to 19 and the total of $x$ and $y$ is an integer from 8 to 19; R is an aryl group selected from phenyl, naphthyl, and phenyl substituted with from 1 to 2 groups selected from methyl, hydroxy, methoxy, and phenoxy; wherein $R_1$ and $R_2$ are selected from (1) alkyls of 1 to 3 carbons; (2) —$(CH_2CH_2O)_pH$ for $R_1$ and —$(CH_2CH_2O)_rH$ for $R_2$;

(3)    $-\left(\begin{array}{c}CH_3\\|\\CHCH_2O\end{array}\right)_pH$ for $R_1$ and $-\left(\begin{array}{c}CH_3\\|\\CHCH_2O\end{array}\right)_rH$ for $R_2$ (4)
$$-CH_2(CH_2)_{x'}\underset{R'}{\overset{H}{C}}(CH_2)_{y'}CH_3 \text{ for } R_2$$

where $R_1$ is selected from (A) alkyls of 1 to 3 carbons, (B) —$(CH_2CH_2O)_pH$, and (C)    $-\left(\begin{array}{c}CH_3\\|\\CHCH_2O\end{array}\right)_pH$ and (5) —$(CH_2)_zNR_3R_4$ for $R_2$ where $R_1$, $R_3$, and $R_4$ are selected from (A) alkyls of 1 to 3 carbons, (B) —$(CH_2CH_2O)_mH$ for $R_1$, —$(CH_2CH_2O)_wH$ for $R_3$, and —$(CH_2CH_2O)_sH$ for $R_4$, and (C)    $-\left(\begin{array}{c}CH_3\\|\\CHCH_2O\end{array}\right)_mH$ for $R_1$, $-\left(\begin{array}{c}CH_3\\|\\CHCH_2O\end{array}\right)_wH$ for $R_3$ and
$-\left(\begin{array}{c}CH_3\\|\\CHCH_2O\end{array}\right)_sH$ for $R_4$ and wherein $p$ and $r$ are integers from 1 to 40 with the total of $p$ plus $r$ not exceeding 60, $m$, $w$, and $s$ are integers from 1 to 40 with the total of $m$ plus $w$ plus $s$ not exceeding 80, $x'$ and $y'$ are integers as defined for $x$ and $y$ above, R' is selected from R and H, and $z$ is an integer from 2 to 6.

2. The compounds of claim 1 wherein R is phenyl and the phenyl-substituted tertiary amines are in the form of an isomeric mixture.

3. The compounds of claim 1 wherein $x$ and $y$ are integers from 0 to 15 and the total of $x$ and $y$ is 15.

4. Aryl-substituted aliphatic tertiary amines represented by the formula

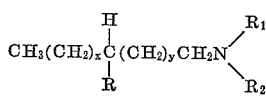

wherein $x$ and $y$ are integers from 0 to 19 and the total of x and y is an integer from 8 to 19, and R is an aryl group selected from phenyl, naphthyl, and phenyl substituted with from 1 to 2 groups selected from methyl, hydroxy, methoxy, and phenoxy, wherein $R_1$ and $R_2$ are selected from (1) alkyls of 1 to 3 carbons, and (2)

—$(CH_2CH_2O)_pH$
for $R_1$ and
—$(CH_2CH_2O)_rH$
for $R_2$, and (3)   $-\left(\begin{array}{c}CH_3\\|\\CHCH_2O\end{array}\right)_pH$ for $R_1$, and $-\left(\begin{array}{c}CH_3\\|\\CHCH_2O\end{array}\right)_rH$ for $R_2$, and wherein $p$ and $r$ are integers from 1 to 40 with the total of $p$ plus $r$ not exceeding 60.

5. Aryl-substituted aliphatic tertiary amines represented by the formula

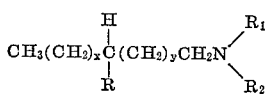

wherein $x$ and $y$ are integers from 0 to 19 and the total of $x$ and $y$ is an integer from 8 to 19, and R is an aryl group selected from phenyl, naphthyl, and phenyl substituted with from 1 to 2 groups selected from methyl, hydroxy, methoxy, and phenoxy, wherein $R_2$ is —$(CH_2)_zNR_3R_4$ wherein $z$ is an integer from 2 to 6, and $R_1$, $R_3$, and $R_4$ are selected from (A) alkyls of 1 to 3 carbons, (B)

—$(CH_2CH_2O)_mH$ for $R_1$, —$(CH_2CH_2O)_wH$ for $R_3$, and
—$(CH_2CH_2O)_sH$ for $R_4$, and (C)
$-\left(\begin{array}{c}CH_3\\|\\CHCH_2O\end{array}\right)_mH$ for $R_1$, $-\left(\begin{array}{c}CH_3\\|\\CHCHO_3\end{array}\right)_wH$ for $R_3$, and $-\left(\begin{array}{c}CH_3\\|\\CHCH_2O\end{array}\right)_sH$ for $R_4$, and wherein $m$, $w$, and $s$ are integers from 1 to 40 with the total of $m$ plus $w$ plus $s$ not exceeding 80.

6. Aryl-substituted aliphatic tertiary amines represented by the formula

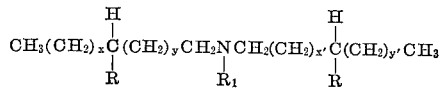

wherein $x$, $x'$, $y$ and $y'$ are integers from 0 to 19 and the totals of $x$ plus $y$ and $x'$ plus $y'$ are each integers from 8 to 19; R is an aryl group selected from phenyl, naphthyl, and phenyl substituted with from 1 to 2 groups selected from methyl, hydroxy, methoxy and phenoxy; R' is selected from R and H; and $R_1$ is selected from (A) alkyls of 1 to 3 carbons, (B) —$(CH_2CH_2O)_pH$, and (C)—$\left(\begin{array}{c}CH_3\\|\\CHCH_2O\end{array}\right)_pH$ wherein $p$ is an integer from 1 to 40

7. The compounds of claim 4 wherein R is phenyl and $R_1$ and $R_2$ are each methyl.

8. The compounds of claim 2 wherein $R_1$ is

—$(CH_2CH_2O)_pH$ and $R_2$ is —$(CH_2CH_2O)_rH$ wherein $p$ and $r$ are integers from 1 to 20 with the sum of $p$ and $r$ not exceeding 30.

9. The compounds of claim 4 wherein R is phenyl, $R_1$ is —$(CH_2CH_2O)_pH$ and $R_2$ is —$(CH_2CH_2O)_rH$ wherein $p$ and $r$ are integers from 1 to 20 with the sum of $p$ and $r$ not exceeding 30.

References Cited

UNITED STATES PATENTS 3,345,309  10/1967  Merten et al. _____ 260—570.8 X
3,345,361  10/1967  Ehrhart _____ 260—570.8 X ROBERT V. HINES, Primary Examiner U.S. Cl. X.R.

252—311.5, 357; 260—465, 413, 501.1, 501.2, 567.6